(12) United States Patent
Loibl et al.

(10) Patent No.: US 9,425,466 B2
(45) Date of Patent: Aug. 23, 2016

(54) PRODUCTION METHOD FOR A TUBULAR FUEL CELL HAVING A TWO-LAYER CAP REGION OF THE SUPPORT BODY

(71) Applicant: Robert Bosch GmbH, Stuttgart (DE)

(72) Inventors: Thomas Loibl, Oberstdorf (DE); Imke Heeren, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 14/361,805

(22) PCT Filed: Oct. 16, 2012

(86) PCT No.: PCT/EP2012/070447
§ 371 (c)(1),
(2) Date: May 30, 2014

(87) PCT Pub. No.: WO2013/079252
PCT Pub. Date: Jun. 6, 2013

(65) Prior Publication Data
US 2014/0356758 A1 Dec. 4, 2014

(30) Foreign Application Priority Data

Nov. 30, 2011 (DE) .......................... 10 2011 087 422

(51) Int. Cl.
*H01M 8/00* (2016.01)
*H01M 8/12* (2016.01)
*H01M 8/02* (2016.01)
*B28B 1/00* (2006.01)
(Continued)

(52) U.S. Cl.
CPC .............. *H01M 8/004* (2013.01); *B28B 1/008* (2013.01); *B28B 1/24* (2013.01); *B28B 21/38* (2013.01); *B28B 21/76* (2013.01); *B28B 21/78* (2013.01); *B28B 21/86* (2013.01); *H01M 8/0252* (2013.01); *H01M 8/0286* (2013.01); *H01M 8/1004* (2013.01); *H01M 8/124* (2013.01); *H01M 8/1226* (2013.01); *H01M 2300/0074* (2013.01); *Y02E 60/521* (2013.01); *Y02E 60/525* (2013.01); *Y02P 70/56* (2015.11)

(58) Field of Classification Search
CPC .............. H01M 8/004; H01M 8/1004; H01M 2008/1293; H01M 8/243; H01M 2300/0074; H01M 8/0252; Y02E 60/525
See application file for complete search history.

(56) References Cited

U.S. PATENT DOCUMENTS

| 4,256,688 A | 3/1981 | Adlerborn et al. |
| 6,379,485 B1 | 4/2002 | Borglum |

(Continued)

FOREIGN PATENT DOCUMENTS

| DE | 102010001005 | 7/2011 |
| DE | 102010001988 | 8/2011 |

(Continued)

OTHER PUBLICATIONS

International Search Report for Application No. PCT/EP2012/070447 dated Feb. 13, 2013 (English Translation, 4 pages).

*Primary Examiner* — Stewart Fraser
(74) *Attorney, Agent, or Firm* — Michael Best & Friedrich LLP

(57) ABSTRACT

A method for producing a tubular fuel cell by means of a pulling-core tool, the pulling-core tool comprising at least one tool part, which forms a cavity, and a pulling core, which can be positioned in at least two positions in the cavity.

24 Claims, 4 Drawing Sheets

(51) Int. Cl.
*B28B 1/24* (2006.01)
*B28B 21/38* (2006.01)
*B28B 21/76* (2006.01)
*B28B 21/78* (2006.01)
*B28B 21/86* (2006.01)
*H01M 8/10* (2016.01)

(56) References Cited

U.S. PATENT DOCUMENTS

| | | |
|---|---|---|
| 6,558,597 B1 | 5/2003 | Corpus |
| 8,574,791 B2 * | 11/2013 | Maus ........................ B28B 1/24 264/262 |
| 2008/0164641 A1 | 7/2008 | Lee et al. |
| 2011/0177434 A1 * | 7/2011 | Maus ........................ B28B 1/24 429/535 |

FOREIGN PATENT DOCUMENTS

| | | |
|---|---|---|
| EP | 0376579 | 7/1990 |
| EP | 1075916 | 2/2001 |
| JP | S6285906 | 4/1987 |
| JP | H01225506 | 9/1989 |
| JP | H0286408 | 3/1990 |
| JP | 2000176991 | 6/2000 |
| JP | 2001079820 | 3/2001 |
| JP | 2008531335 | 8/2008 |

* cited by examiner

PRODUCTION METHOD FOR A TUBULAR FUEL CELL HAVING A TWO-LAYER CAP REGION OF THE SUPPORT BODY

BACKGROUND OF THE INVENTION

The present invention relates to a method for producing a tubular fuel cell, and to a tubular fuel cell, to a fuel cell system, to a pulling-core tool and also to a combined heat and power plant equipped therewith or to a vehicle equipped therewith.

Solid oxide fuel cells (SOFCs) serve for generating electrical power, and possibly also heat, and are often used in auxiliary units or in combined heat and power plants (CHPs) for supplying domestic energy or for supplying industrial energy and in power plants and for generating electrical power on board vehicles. Since solid oxide fuel cells are conventionally operated at temperatures from 600° C. to 1000° C., they are also referred to as high-temperature fuel cells.

Solid oxide fuel cells may have a tubular or planar support body. The fuel cells of the type of interest here have a tubular support body and are therefore to be differentiated from fuel cells of a planar form on the basis of their geometrical embodiment. Fuel cells with a tubular support body are also referred to as tubular fuel cells. Tubular fuel cells may be configured both as open on both sides, so that fuel gas or air can be passed through the tubular fuel cell, and as closed on one end side, it being possible for fuel gas or air to be introduced into the fuel cell by way of a lance on the inside.

The documents US 2008/0164641 A1 and U.S. Pat. No. 6,558,597 B1 describe methods for producing tubular fuel cells.

SUMMARY OF THE INVENTION

The subject matter of the present invention is a method for producing a tubular fuel cell by means of a pulling-core tool.

In this case, the pulling-core tool comprises at least one tool part, which forms a cavity, and a pulling core, which can be positioned in at least two positions in the cavity. A hollow space, which substantially corresponds to the form of a tubular body to be formed that is closed on one side by a cap portion (dome portion), can be formed thereby between the pulling core and the at least one cavity-forming tool part. In addition, the pulling-core tool has at least one sprue channel, which opens out into the hollow-space region in the form of a cap portion.

The method comprises the method steps of:
a) injecting a first injection-molding component for forming a ceramic and/or vitreous material through the sprue channel into the pulling-core tool, the pulling core being positioned in a first position;
b) positioning the pulling core in a second position, in which the pulling core is further away from the sprue channel than in the first position; and
c) injecting a second injection-molding component, different from the first, for forming a ceramic and/or vitreous material through the (same) sprue channel into the pulling-core tool.

A tubular (support) body may be understood as meaning in particular a substantially hollow-cylindrical body, which in principle may have both a substantially round, for example circular or ovaloid (oval-shaped), base area and a polygonal base area. In particular, the tubular (support) body may have a circular base area. Substantially hollow-cylindrical may be understood here as meaning in particular that the (support) body may deviate from an ideal hollow cylinder, for example on account of the cap portion and the mounting portion described later.

A ceramic material may be understood as meaning in particular an inorganic, nonmetallic material. A ceramic material may be at least partially crystalline.

A vitreous material may be understood as meaning an inorganic, nonmetallic, amorphous or noncrystalline material.

Nonmetallic may be understood as meaning in particular that the material does not have any metallic properties, in particular any properties based on metallic bonds. The term nonmetallic therefore does not exclude the possibility that the material may comprise metal compounds, for example metal oxides and/or silicates, for example magnesium silicate, zirconium oxide and/or aluminum oxide.

The term ceramic and/or vitreous may be understood as being meant in particular in the sense that mixed forms may also be comprised, for example inorganic, nonmetallic materials, which are partially crystalline and partially amorphous or vitreous, and have for example so-called glass phases.

The fact that in method step b) the pulling core is positioned in a second position, further away from the sprue channel, advantageously means that, adjoining the cap-shaped hollow space already filled with the first injection-molding component, there can form once again a hollow space in the form of a cap portion, into which the second injection-molding component can then be injected in method step c).

This makes it possible in method step c) to inject the second injection-molding component in such a way that there forms a layer of the second injection-molding component, which partially covers a layer of the first injection-molding component.

Thus, a tubular fuel cell which has a tubular support body that is closed on one side by a cap portion, with two ceramic and/or vitreous layers partially covering one another in the cap portion, can be advantageously produced exclusively by the use of an injection-molding technique.

By the use of a porously sintering injection-molding component and a gas-impermeably sintering injection-molding component, this in turn makes it possible to provide a tubular support body that is closed on one side by a cap portion for a tubular fuel cell of ceramic and/or vitreous materials, the cap portion of which is gas-impermeable overall, on account of the layers covering one another, and which otherwise may have porous or gas-permeable portions. On the porous portions of the tubular support body, the electrochemically active electrode-electrolyte units of the fuel cell may be provided in particular. It can in this case be accomplished by the cap portion, which is gas-impermeable on account of the layers covering one another, that a gas, for example air or fuel gas, is supplied to the electrode-electrolyte units only through the porous portions and an "electrochemical short-circuit" is avoided.

The supporting properties may in this case be assumed by the tubular support body, whereby it is advantageously made possible to make the electrode-electrolyte units thinner, and in particular their electrolytes. For example, the electrolyte may in this way even be made so thin that it only has a layer thickness of approximately 15 μm. This advantageously allows the operating temperature to be lowered to at least 750° C., the output performance of the fuel cell to be increased and the degradation tendency of the fuel cell to be significantly reduced. Moreover, making them thinner allows material costs to be saved. Lowering the operating temperature also has the advantage that more affordable materials with a lower thermal stability can also be used, whereby the material costs can be lowered further.

The sprue channel may advantageously be used for injecting both the first and the second injection-molding component. Moreover, the method allows the number of removal method steps and cycle times to be reduced. Thus, overall production can be advantageously simplified and speeded up.

In particular, the method advantageously allows weld lines to be avoided, which has advantageous effects on the mechanical stability of the fuel cell. Moreover, with the method it is possible to dispense with subsequent coating of the body, and possibly a removal of sprue fragments.

In one embodiment, the sprue channel opens out into a central region of the hollow-space region in the form of a cap portion, for example at the apex point of the hollow-space region in the form of a cap portion. Central gating in this region advantageously makes gating of the entire component possible without any weld line, in particular since a uniform, peripheral flow front can form. Thus, flaws in the ceramic and/or vitreous body can be advantageously avoided. Moreover, central gating advantageously allows waving or shifting of the functional layer system explained later to be avoided.

In a further embodiment, the sprue channel has an inner flow divider, in particular a so-called torpedo.

In a further embodiment, the pulling core has a sprue pin, which is for example conical and extends in the direction of the flow divider. In particular, the sprue pin may in this case extend into the central region of the hollow-space region in the form of a cap portion.

In a further embodiment, the pulling core, in particular the sprue pin of the pulling core, is in contact with the flow divider in method step a), while the pulling core, in particular the sprue pin of the pulling core, is not in contact with the flow divider in method step c). In this way, the layer of the second injection-molding component may partially cover the layer of the first injection-molding component on the side facing away from the sprue channel.

This may be brought about by the sprue pin of the pulling core being moved in method step b) with the pulling core away from the sprue channel, and consequently from the flow divider of the sprue channel. In addition, in method step b) the flow divider may be moved away from the pulling core, in particular from the sprue pin of the pulling core.

In a further embodiment, the first and second injection-molding components are designed for forming an electrically insulating and/or ionically insulating, ceramic and/or vitreous material.

In a further embodiment, the first injection-molding component is designed for forming a porous ceramic and/or vitreous material and the second injection-molding component is designed for forming a gas-impermeable ceramic and/or vitreous material. The first injection-molding component may for example be designed for forming a ceramic and/or vitreous material with an open porosity of 20%, for example of 25% or of 30% or of 40%, for example of approximately 40%. The porosity may for example be measured by means of diffusion or flow measurement, for example by way of so-called diffusion cells for example by the Wicke-Kallenbach method, mercury porosimetry and/or light-optical microscopy or scanning electron microscopy.

The pores may have an average pore size of ≤300 µm, for example ≤200 µm or ≤100 µm or ≤50 µm. In particular, the pores may have a substantially elongate form. For example, the pores may have an average length in a range from ≥100 µm to ≤300 µm, in particular from ≥150 µm to ≤250 µm, for example of approximately 200 µm, and an average diameter in a range from ≥1 µm to ≤70 µm, in particular from ≥5 µm to ≤30 µm, for example from approximately ≥5 µm to ≤10 µm or of approximately 20 µm.

The pores may in particular produce a percolating pore network with an aperture distribution in a range from ≥1 µm to ≤20 µm, in particular from ≥1 µm to ≤10 µm, for example of approximately 5 µm. Such a pore aperture distribution advantageously allows free gas diffusion to be made possible, in particular without the occurrence of a so-called Knudsen effect.

The first and second injection-molding components may for example be designed for forming at least one ceramic and/or vitreous material that is selected from the group consisting of magnesium silicates, in particular forsterite, zirconium dioxide, in particular doped zirconium dioxide, for example zirconium dioxide doped with 6.5% by weight of yttrium oxide (Y2O3), aluminum oxide, aluminum oxide/zirconium oxide mixtures, spinels, for example magnesium aluminate, zirconium oxide/glass mixtures, zinc oxide and combinations thereof.

The first injection-molding component may in this case comprise in particular a pore former. The pore former may be removed in a subsequent method step, for example a debinding step and/or sintering step, with the formation of pores.

The second injection-molding component may in this case be in particular free from pore formers, in particular to form a gas-impermeable material.

In a further embodiment, the first and second injection-molding components differ from one another substantially (only) in that the first injection-molding component, by contrast with the second injection-molding component, comprises a pore former.

In order to provide the tubular support body with electrode-electrolyte units, before method step a) a sandwich-like functional layer system, which is designed for forming at least one electrode-electrolyte unit having a cathode, an anode and an electrolyte arranged in between, may be arranged on the pulling core or on at least one of the cavity-forming surfaces of the tool parts. In particular, the functional layer system may be designed for forming a multiplicity of electrode-electrolyte units and for example for their electrical interconnection with one another and, for example, for their electrical and/or ionic insulation from one another. For this, the functional layer system may comprise, inter alia, a cathode layer, an anode layer and an electrolyte layer arranged in between. In order to separate electrode-electrolyte units ionically and/or electrically from one another and/or connect electrode-electrolyte units electrically to one another, the functional layer system may comprise electrical insulating regions and/or electrical conducting regions.

Preferably, in method step a) the first injection-molding component is injected in such a way that the functional layer system is covered, in particular completely, by the first injection-molding component.

The functional layer system may be arranged for example in the form of a film, in particular a sleeve-shaped film, on the pulling core. However, it is similarly possible to apply the functional layer system to the pulling core, for example by means of screen printing, in particular by means of rotary screen printing. In particular, this may involve at least one removable layer that has little adhesion with respect to the pulling core being provided between the pulling core and the functional layer system.

After the injection of the first injection-molding component in method step a), the functional layer system may already enter into a (provisional) bond with the first injection-molding component, which enables the pulling tool to be transferred into the second position without the functional layer system thereby being moved significantly out of the position that it has adopted in the course of method step a) or in the first position of the pulling-core tool.

As a result, the second injection-molding component can be injected in method step c) in such a way that it partially, in particular slightly, overlaps or covers the functional layer system. For example, the second injection-molding component may thereby overlap or cover a peripheral portion of the functional layer system, in particular an electrochemically inactive peripheral portion of the functional layer system, for example an electrical insulating and/or conducting region of the functional layer system. An overlap advantageously allows particularly great gas impermeability to be achieved.

In a further embodiment, the functional layer system is arranged on the pulling core or the cavity-forming surface of the tool parts in such a way that the cathode(s), in particular the cathode layer, is arranged on the side of the functional layer system that is facing away from the pulling core or the cavity-forming surface.

Such an arrangement can bring about the effect that the cathode can be supplied with air through the porous, tubular support body, it being possible for the anode and electrical lines for the electrical contacting of the cathode and the anode to be operated under a non-oxidizing or reducing fuel gas atmosphere (hydrogen, methane, . . . ). This has the advantage that base metals and their alloys, for example nickel or nickel alloys, can be used as anode material and/or as material for electrical lines, in particular for the electrical contacting of the anode and the cathode, these metals being able to have a high degree of chemical stability under a reducing atmosphere even at high temperatures, which otherwise can only be achieved, in particular under an oxidizing atmosphere, by cost-intensive precious metals, such as platinum. Thus, the material and production costs can be advantageously reduced.

In a further embodiment, the method also comprises method step d): making the first and second injection-molding components set.

In particular, method step d) may include a thermal treatment, for example at a temperature of ≤1200° C.

In a special refinement of this embodiment, in method step d) the first and second injection-molding components are sintered together (cosintering). During the sintering, an intimate bond may be formed between the two injection-molding components. In particular, the functional layer system may thereby also be sintered together with the first and second injection-molding components.

The injection-molding components may be adapted to one another, in particular with respect to their sintering behavior. In this case it is possible to set the absolute shrinkage by way of the contents of solids in the injection-molding components, a small ceramic/glass content in the injection-molding component being able to lead to a greater shrinkage than a high ceramic/glass content. Alternatively or in addition to this, the sintering kinetics, which can be described by the sintering rate over the temperature, can be set by way of grain sizes.

In method step d), the first and second injection-molding components may also be freed of binders (debinded) together, for example thermally and/or by a solvent. In this case, the functional layer system in particular may also be freed of binders (debinded) together with the first and second injection-molding components.

In particular, in method step d) the pore former may also be removed from the first injection-molding component.

With regard to further advantages and features of the invention, reference is hereby made explicitly to the explanations in connection with the figures.

A further subject matter of the present invention is a tubular fuel cell.

The tubular fuel cell may be produced in particular by a method according to the invention.

In particular, the tubular fuel cell may comprise a tubular support body, which is closed at one end of the tube by a cap portion, and at least one electrode-electrolyte unit, which comprises a cathode, an anode and an electrolyte arranged in between. The electrode-electrolyte unit(s) may in this case be applied on the inner side or on the outer side, in particular on the inner side, of the tubular support body, it being possible for the tubular support body to have in particular in the portion or portions adjoining the electrode-electrolyte unit(s) gas-permeable pores and/or openings and to have in the cap portion at least two ceramic and/or vitreous layers produced by injection molding and partially covering one another.

In particular, in the cap portion, an outer layer may be made porous and an inner layer may be made gas-impermeable. The porous layer may in this case also form in particular the portion(s) of the tubular support body that adjoin(s) the electrode-electrolyte unit(s). The gas-impermeable layer may in particular partially, in particular slightly, overlap or cover the functional layer system, for example an electrochemically inactive peripheral portion of the functional layer system, for example an electrical insulating and/or conducting region of the functional layer system.

With regard to further technical features and advantages of the tubular fuel cell according to the invention, reference is hereby made explicitly to the explanations in connection with the method according to the invention and the figures.

Furthermore, the present invention relates to a fuel cell system, which comprises at least one fuel cell, in particular a multiplicity of fuel cells, according to the invention.

In addition, the present invention relates to a pulling-core tool, in particular for use in the method according to the invention.

Furthermore, the present invention relates to a combined heat and power plant, for example for a domestic or commercial building, an industrial plant, a power plant or a vehicle, for example a micro combined heat and power plant, and/or a vehicle, which comprise(s) at least one fuel cell according to the invention or a fuel cell system according to the invention. A (micro) combined heat and power plant may be understood as meaning in particular a plant for the simultaneous generation of power and heat from an energy source.

With regard to further advantages and features of the fuel cell system, of the pulling-core tool, of the combined heat and power plant and of the vehicle, reference is hereby made explicitly to the explanations in connection with the method according to the invention, the fuel cell according to the invention and the figures.

BRIEF DESCRIPTION OF THE DRAWINGS

Further advantages and advantageous refinements of the subjects according to the invention are illustrated by the drawings and are explained in the description that follows. It should be noted here that the drawings only have a descriptive character and are not intended to restrict the invention in any form. In them.

DETAILED DESCRIPTION

FIGS. 1 to 4 illustrate an embodiment of a method according to the invention with a pulling-core tool according to the invention.

Figure 1:
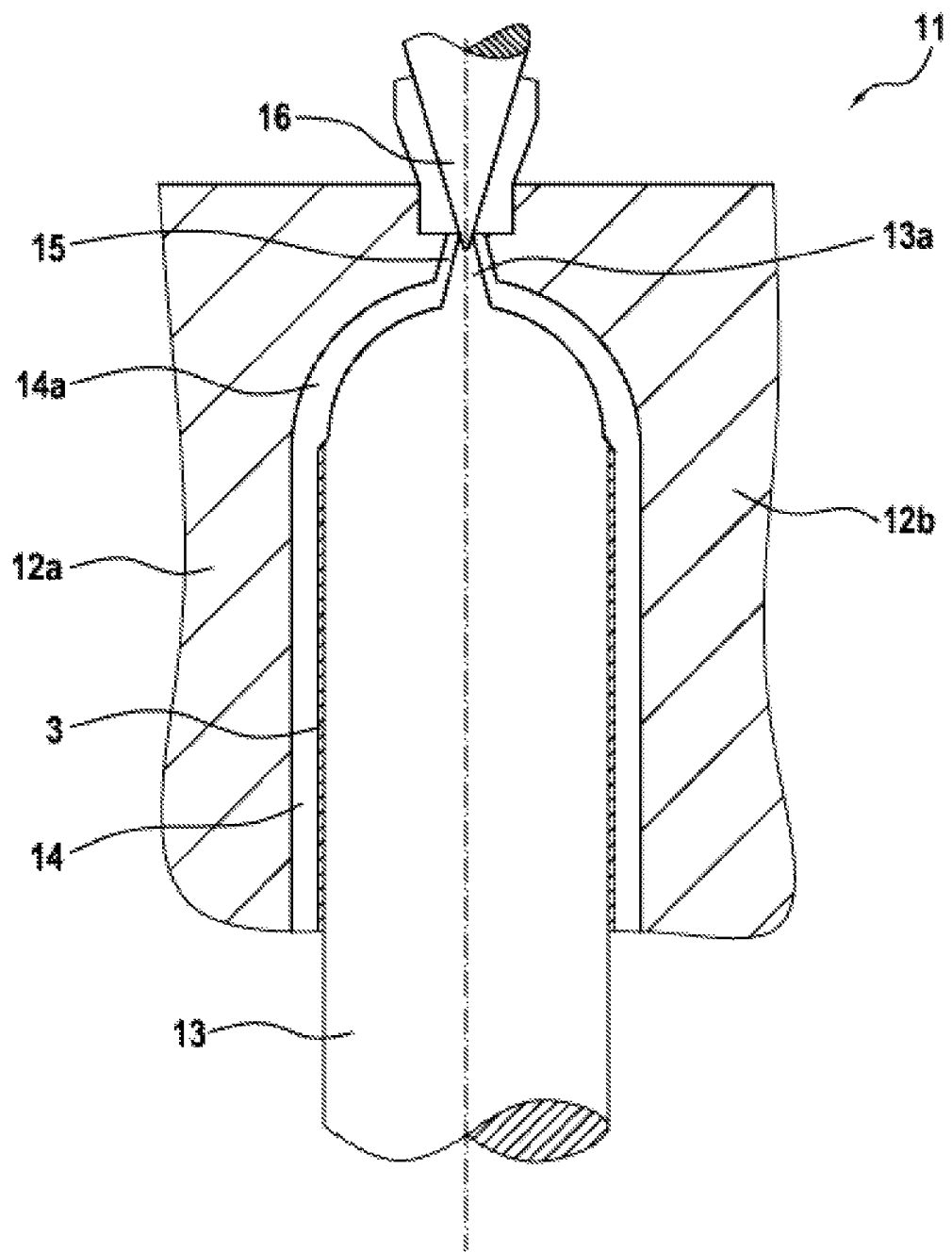
FIGS. 1-4 show schematic cross-sectional views to illustrate an embodiment of the method according to the invention.
Figure 2:
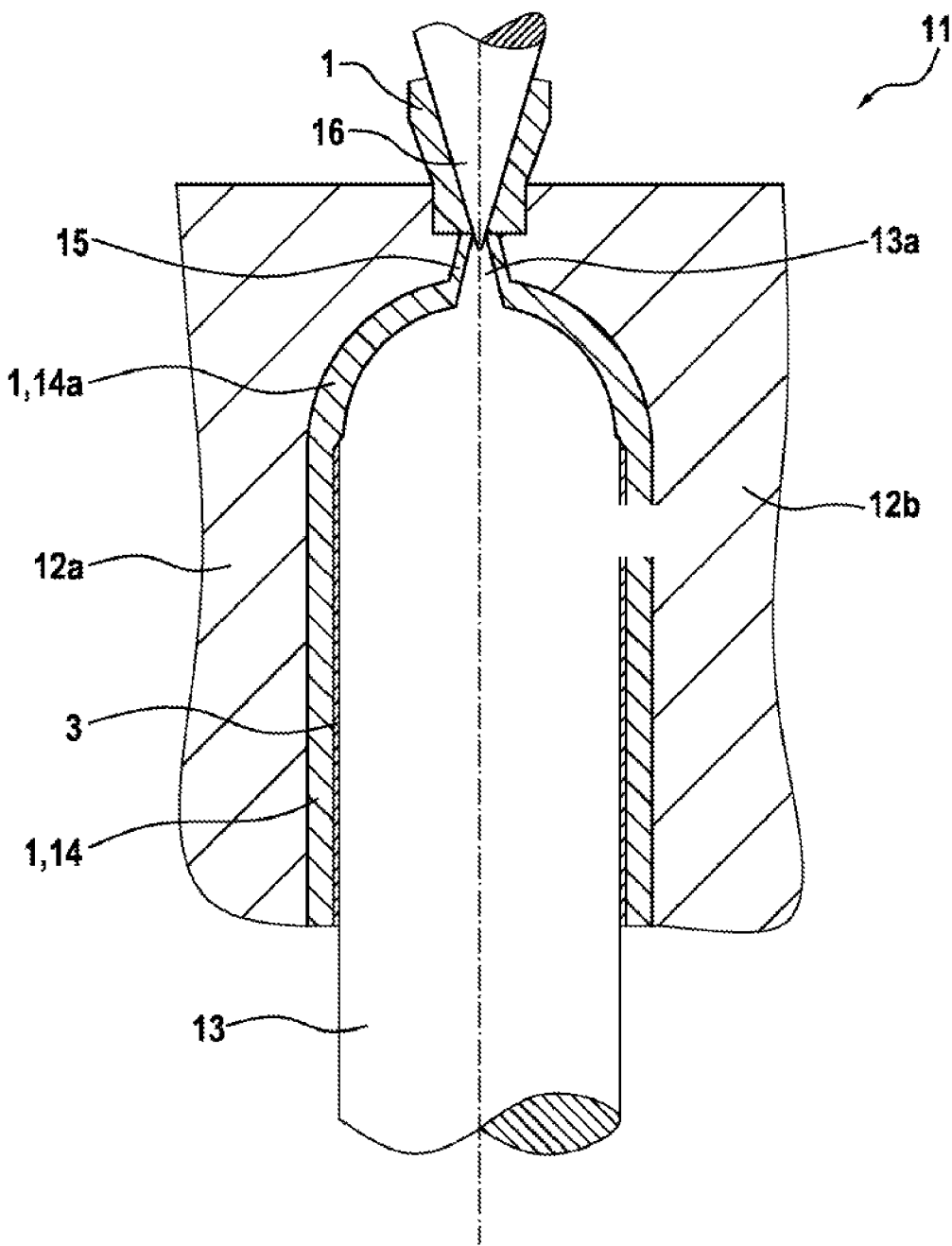
Figure 3:
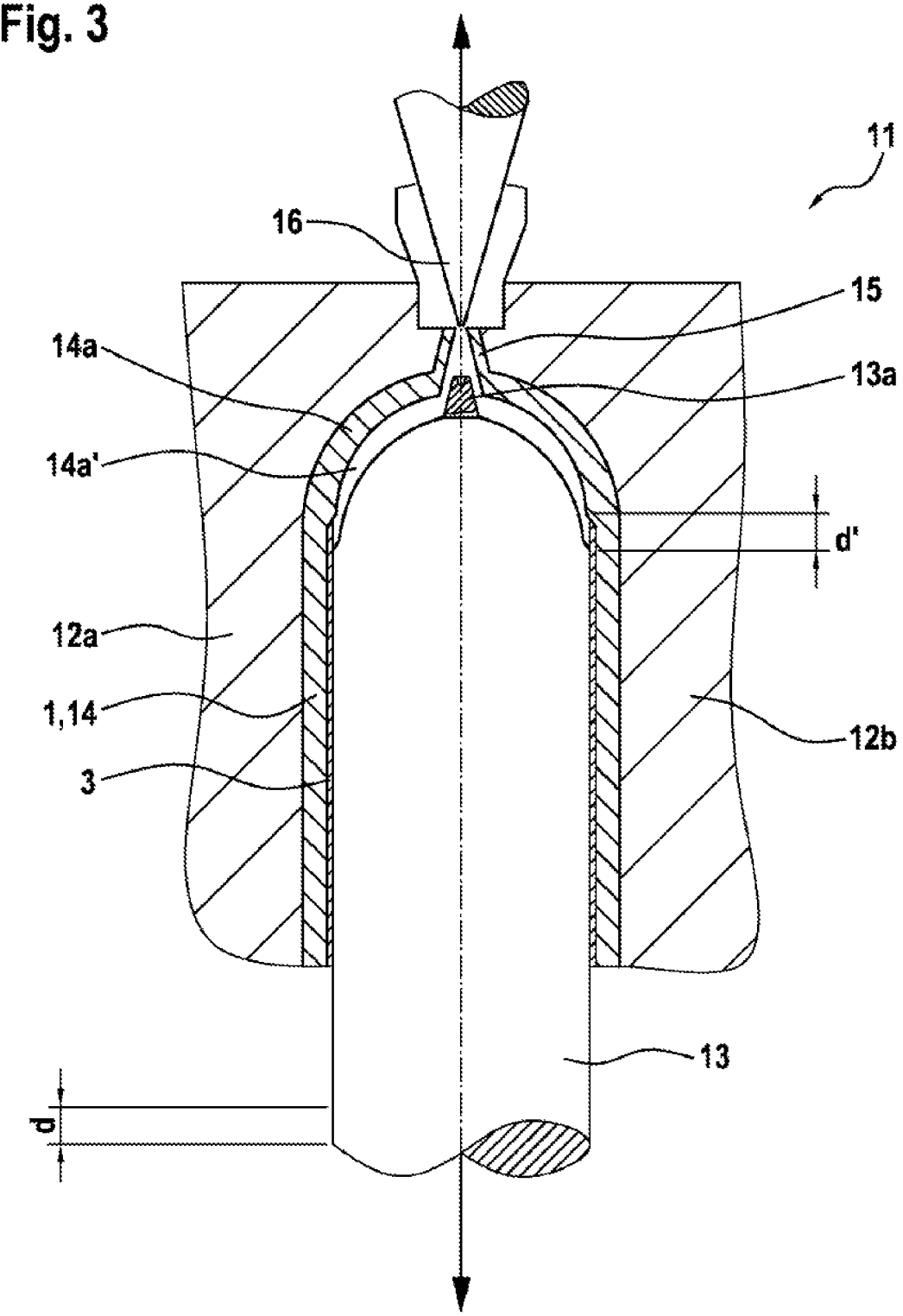
Figure 4:
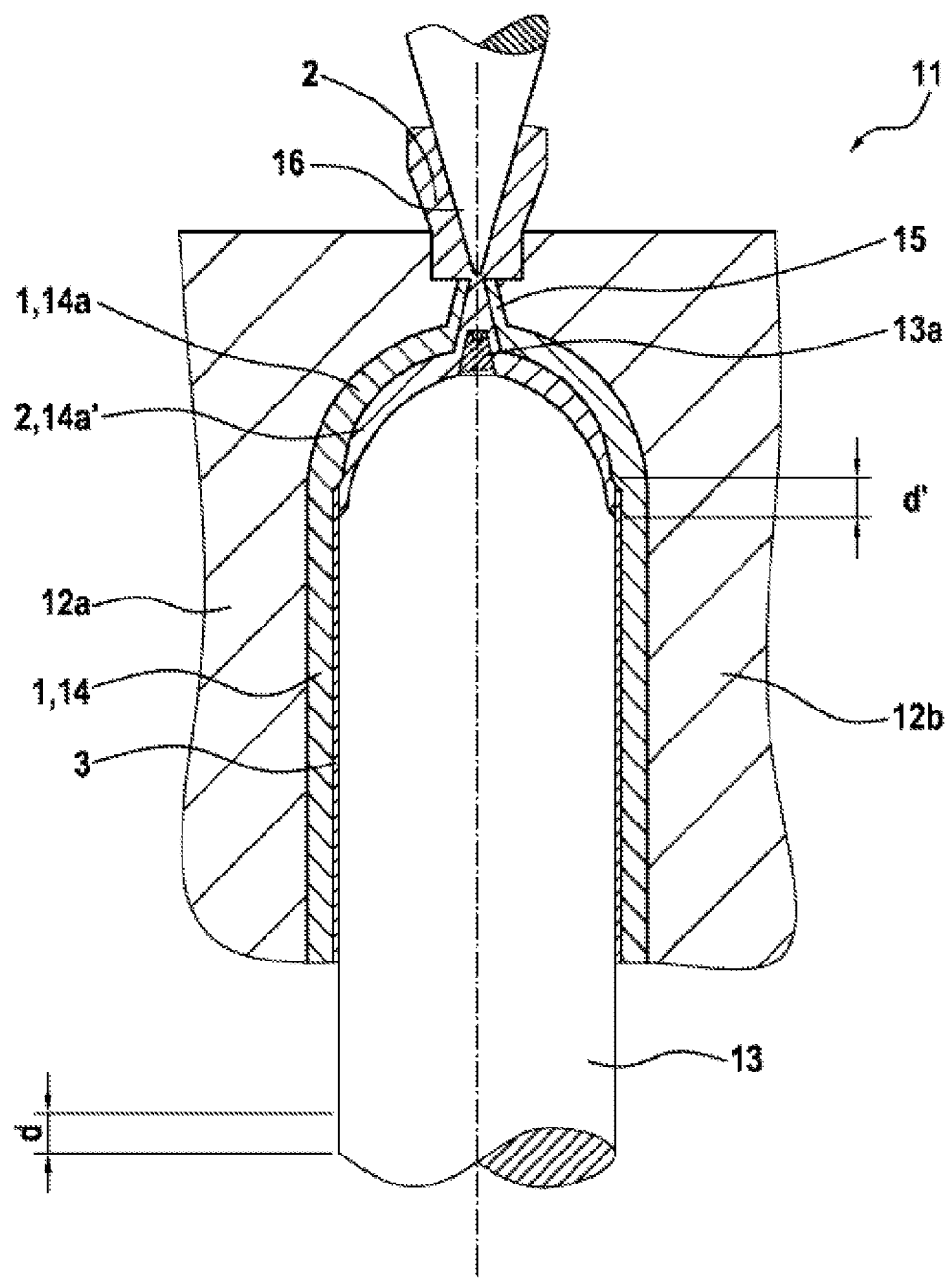

FIG. 1 thereby illustrates the pulling-core tool. FIGS. 2 to 4 illustrate method steps a), b) and c) of the method, explained in more detail later.

FIG. 1 shows a pulling-core tool, which has two tool parts 12a, 12b, which form a cavity, and also a pulling core 13, which can be positioned in the cavity and in FIGS. 1 and 2 is positioned in first position A and in FIGS. 3 and 4 is positioned in a second position B.

FIG. 1 illustrates that a hollow space 14, 14a, which substantially corresponds to the form of a tubular body to be formed that is closed on one side by a cap portion, can be formed between the pulling core 13 and the cavity-forming tool parts 12a, 12b. FIGS. 1, 3 and 4 show that the form of the hollow space 14, 14a, which is formed in the first position A, shown in FIGS. 1 and 2, can soften slightly from the form of the tubular body 1, 2 to be formed that is closed by a cap portion and is shown in FIG. 4, in particular on account of the hollow space 14a', which is additionally formed in the second position B, shown in FIG. 3.

FIG. 1 also illustrates that the pulling-core tool has a sprue channel 15, which opens out into a central region of the hollow-space region 14a in the form of a cap portion and in which an inner flow divider 16, in particular a so-called torpedo, is provided. The pulling core 13 is in this case equipped with a conical sprue pin 13a, which extends in the direction of the flow divider 16 and is in contact with the flow divider 16 in FIG. 1 and during method step a) that is represented in FIG. 2.

FIG. 1 shows that before method step a) a sandwich-like functional layer system 3, which is designed for forming at least one electrode-electrolyte unit having a cathode, an anode and an electrolyte arranged in between, has been arranged on the pulling core 13. The functional layer system 3 has in this case been applied to the pulling core 13 in the form of a sleeve-shaped film or by means of screen printing.

FIG. 2 illustrates that in method step a) the pulling core 13 is positioned in the first position A, a first injection-molding component 1 for forming a ceramic and/or vitreous material being injected through the sprue channel 15 into the pulling-core tool 11 in such a way that the functional layer system 3 is covered, in particular completely, by the first injection-molding component 1. In this process step, it is possible in particular for an entire tube of porously sintered material to be injected by way of the central annular sprue channel.

FIG. 3 illustrates that in method step b) the pulling core 13 moves by a distance d in the axial direction and is positioned in the second position B, which is further away from the sprue channel 15 and in which the sprue pin 13a is no longer in contact with the flow divider 16. In this case, adjoining the cap-shaped hollow space 14a, which has already been filled in method step a) with the first injection-molding component 1, there can form once again a hollow space 14a' in the form of a cap portion, into which the second injection-molding component 2 can be injected in method step c). The second injection-molding component 2 may thereby partially overlap or cover the functional layer system 3, in particular a portion d' of the functional layer system, whereby "electrochemical" short-circuits—in particular caused by unwanted passing through of gas—can be advantageously avoided.

Moreover, FIG. 3 illustrates that, in this embodiment, in method step b) the flow divider 16 is also positioned or moved away from the pulling core 13, in particular from the sprue pin 13a of the pulling core 13.

In particular, the flow dividers 16 that are shown in FIGS. 1 and 2 and in FIGS. 3 and 4 may be the flow dividers of different sprue systems. For example, the first sprue system may be designed for injecting the first injection-molding component 1 and the second sprue system may be designed for injecting the second injection-molding component 2, both sprue systems having flow dividers 16, which differ in particular in that the flow divider 16 of the first sprue system extends further in the direction of the pulling core 13, in particular of the sprue pin 13a of the pulling core 13, than the flow divider of the second sprue system. The pulling-core tool 11 may be moved between the sprue systems for example by means of a rotary/sliding table or a turning platen mold.

FIG. 4 illustrates that in method step c) a second injection-molding component 2, different from the first, for forming a ceramic and/or vitreous material is injected through the sprue channel 15 into the pulling-core tool 11, in particular into the hollow space 14a' in the form of a cap portion newly formed in method step b). In method step c) there is formed a layer of the second injection-molding component 2, which partially covers the layer of the first injection-molding component 1, formed in method step a), on the side facing away from the sprue channel 15.

The first injection-molding component 1 is designed here for forming a porous ceramic and/or vitreous material and the second injection-molding component 2 is designed for forming a gas-impermeable ceramic and/or vitreous material. The first 1 and second 2 injection-molding components may differ here from one another substantially (only) in that the first injection-molding component 1, by contrast with the second injection-molding component 2, comprises a pore former.

After the removal of the molding from the pulling-core tool, the pin formed in the sprue channel 15 may in principle be left on the support body. Should the pin be troublesome during mounting, it is however similarly possible to remove it before a later setting method step (d), in particular a sintering step. This would then expose at the apex point a punctiform region of densely sintering material that is surrounded by porously sintering material, which differs in color and surface gloss from the densely sintering material.

FIG. 4 also illustrates that in this way it is possible to produce a tubular fuel cell, which comprises a tubular support body 1, 2, which is closed at one end of the tube by a cap portion, and a functional layer system 3, which has electrode-electrolyte units. In the refinement shown, the electrode-electrolyte units 3 are on the inner side of the tubular support body 1, 2, which has in the portion adjoining the electrode-electrolyte units 3 gas-permeable pores and in the cap portion two ceramic and/or vitreous layers 1, 2 that are produced by injection molding and cover one another.

FIG. 4 also illustrates that the outer layer 1 may be made porous and the inner layer 2 may be made gas-impermeable and that the porous layer 1 may also form the portion of the tubular support body 1, 2 that adjoins the electrode-electrolyte units 3.

The invention claimed is:

1. A method for producing a tubular fuel cell by means of a pulling-core tool, the pulling-core tool comprising:
   at least one tool part, which forms a cavity, and
   a pulling core, which can be positioned in at least two positions in the cavity,
wherein a hollow space, which substantially corresponds to a form of a tubular body to be formed that is closed on one side by a cap portion, can be formed between the pulling core and the at least one tool part, the pulling-core tool having at least one sprue channel, which opens out into a hollow-space region in the form of a cap portion,
wherein the method comprises the method steps of:
a) injecting a first injection-molding component for forming a ceramic and/or vitreous material through the sprue channel into the pulling-core tool, the pulling core being positioned in a first position;
b) positioning the pulling core in a second position, in which the pulling core is further away from the sprue channel than in the first position; and
c) injecting a second injection-molding component, different from the first, for forming a ceramic and/or vitreous material through the sprue channel into the pulling-core tool.

2. The method as claimed in claim 1, wherein in method step c) the second injection-molding component is injected through the sprue channel into the pulling-core tool in such a way that there forms a layer of the second injection-molding component, which partially covers a layer of the first injection-molding component.

3. The method as claimed in claim 1, wherein the sprue channel opens out into a central region of the hollow-space region in the form of a cap portion.

4. The method as claimed in claim 1, wherein the sprue channel has an inner flow divider.

5. The method as claimed in claim 4, wherein the pulling core has a sprue pin.

6. The method as claimed in claim 4,
wherein in method step a) the pulling core is in contact with the flow divider, and
wherein in method step c) the pulling core is not in contact with the flow divider.

7. The method as claimed in claim 4, wherein in method step b) the flow divider is moved away from the pulling core.

8. The method as claimed in claim 4, wherein the pulling core has a sprue pin, which is conical and extends in the direction of the flow divider, and wherein the sprue pin extends into the central region of the hollow-space region in the form of a cap portion.

9. The method as claimed in claim 4,
wherein in method step a) the sprue pin of the pulling core, is in contact with the flow divider, and
wherein in method step c) the sprue pin of the pulling core, is not in contact with the flow divider.

10. The method as claimed in claim 4, wherein in method step b) the flow divider is moved away from the sprue pin of the pulling core.

11. The method as claimed in claim 1, wherein the first and second injection-molding components are designed for forming an electrically insulating and/or ionically insulating, ceramic and/or vitreous material.

12. The method as claimed in claim 1,
wherein the first injection-molding component is designed for forming a porous ceramic and/or vitreous material, and
wherein the second injection-molding component is designed for forming a gas-impermeable ceramic and/or vitreous material.

13. The method as claimed in claim 1, wherein the first and second injection-molding components differ from one another substantially in that the first injection-molding component, by contrast with the second injection-molding component, comprises a pore former.

14. The method as claimed in claim 1, wherein before method step a) a sandwich-like functional layer system, which is designed for forming at least one electrode-electrolyte unit having a cathode, an anode and an electrolyte arranged in between, is arranged on the pulling core or on at least one of the cavity-forming surfaces of the at least one tool part.

15. The method as claimed in claim 14, wherein the functional layer system is arranged on the pulling core or the cavity-forming surface of the at least one tool part in such a way that the cathode is arranged on the side of the functional layer system that is facing away from the pulling core or the cavity-forming surface.

16. The method as claimed in claim 15, wherein the method also comprises method step d):
making the first and second injection-molding components set, wherein setting includes a thermal treatment;
wherein in method step d) the first and second injection-molding components are sintered together; and
wherein the functional layer system is also sintered together with the first and second injection-molding components.

17. The method of claim 16, wherein setting includes a thermal treatment at a temperature of $\leq 1200°$ C.

18. The method as claimed in claim 1, wherein the method also comprises method step d):
making the first and second injection-molding components set.

19. The method as claimed in claim 1, wherein in method step c) the second injection-molding component is injected through the sprue channel into the pulling-core tool in such a way that there forms a layer of the second injection-molding component, which partially covers a layer of the first injection-molding component, wherein the layer of the second injection-molding component partially covers the layer of the first injection-molding component on the side facing away from the sprue channel.

20. The method as claimed in claim 1, wherein the sprue channel has an inner flow divider in the form of a torpedo.

21. A tubular fuel cell, comprising
a tubular support body, which is closed at one end by a cap portion and
at least one electrode-electrolyte unit, which comprises a cathode, an anode and an electrolyte arranged in between,
wherein the at least one electrode-electrolyte unit is applied on an inner side or on an outer side of the tubular support body,
wherein the tubular support body has in a portion or portions adjoining the electrode-electrolyte unit(s) gas-permeable pores and/or openings, and
wherein the tubular support body has in the cap portion at least two ceramic and/or vitreous layers produced by injection molding and partially covering one another.

22. The tubular fuel cell as claimed in claim 21, wherein, in the cap portion, an outer layer is made porous and an inner layer is made gas-impermeable.

23. The tubular fuel cell as claimed in claim 21, wherein, in the cap portion, an outer layer is made porous and an inner layer is made gas-impermeable, and wherein the outer layer also forms the portion or portions of the tubular support body that adjoin the electrode-electrolyte unit(s).

24. A tubular fuel cell, comprising
a tubular support body, which is closed at one end by a cap portion and
at least one electrode-electrolyte unit, which comprises a cathode, an anode and an electrolyte arranged in between, wherein the at least one electrode-electrolyte unit is applied on an inner side of the tubular support body,
wherein the tubular support body has in a portion or portions adjoining the electrode-electrolyte unit(s) gas-permeable pores and/or openings, and
wherein the tubular support body has in the cap portion at least two ceramic and/or vitreous layers produced by injection molding and partially covering one another.

* * * * *